US007012403B2

(12) United States Patent
Hwang

(10) Patent No.: US 7,012,403 B2
(45) Date of Patent: Mar. 14, 2006

(54) CHARGER WITH REPLACEABLE SIGNAL LINE FOR A CAR

(76) Inventor: Steve Han Shi Hwang, 3F, No. 142 Li-De Street, Chungho City, Taipei Hsien (TW)

( * ) Notice: Subject to any disclaimer, the term of this patent is extended or adjusted under 35 U.S.C. 154(b) by 3 days.

(21) Appl. No.: 10/327,791

(22) Filed: Dec. 23, 2002

(65) Prior Publication Data

US 2003/0117106 A1    Jun. 26, 2003

(30) Foreign Application Priority Data

Dec. 21, 2001    (TW)    .............................. 90222490 U

(51) Int. Cl.
*H02J 7/00* (2006.01)
(52) U.S. Cl. ...................... 320/107; 320/112; 439/638
(58) Field of Classification Search ................ 320/107, 320/112, 113, 114, 115, 111; 429/90, 99, 429/100, 96, 97, 98; 439/13, 131, 518, 638
See application file for complete search history.

(56) References Cited

U.S. PATENT DOCUMENTS

| 4,180,810 | A | * | 12/1979 | Muncheryan | ................ 340/407 |
| 5,829,993 | A | * | 11/1998 | Wu | .............................. 439/131 |
| 5,860,824 | A | * | 1/1999 | Fan | ............................. 439/265 |
| 5,906,509 | A | * | 5/1999 | Wu | .............................. 439/518 |
| 5,967,807 | A | * | 10/1999 | Wu | .............................. 439/131 |
| 6,058,184 | A | * | 5/2000 | Frank | ........................... 379/420 |
| 6,064,177 | A | * | 5/2000 | Dixon | ......................... 320/111 |
| 6,240,175 | B1 | * | 5/2001 | Barber | ........................ 379/355 |
| 6,249,107 | B1 | * | 6/2001 | Wolfe et al. | ................. 320/150 |

FOREIGN PATENT DOCUMENTS

JP                11214099 A    *    8/1999

* cited by examiner

*Primary Examiner*—Donald Sparks
*Assistant Examiner*—Lawrence Luk
(74) *Attorney, Agent, or Firm*—Law Offices of John Chupa & Associates, P.C.

(57) ABSTRACT

A charger with a replaceable signal for a car includes a casing and a circuit board. The casing is provided with a current taking plug at a lateral side thereof. The circuit board is disposed in the casing and electrically connected to the current taking plug for rectifying and transformed an input power. It is characterized in that the casing at a proper position thereof is provided with a signal socket to electrically connect with the circuit board and a stopper being located therein; a signal line at an end thereof has a signal plug being detachably inserted into the signal socket and the stopper has an engaging piece for engaging with the signal plug and allowing the signal line fixedly joined to the casing laterally and the signal line at a another end thereof has a connector. Once the connector of the signal line is connected to an output/input port of a personal electric product and the current taking plug is inserted to a lighter device in a car, a recharging circuit can be performed.

1 Claim, 3 Drawing Sheets

CHARGER WITH REPLACEABLE SIGNAL LINE FOR A CAR

BACKGROUND OF THE INVENTION

1. Field of the Invention

The present invention relates to a charger for a car and particularly to a replaceable signal line used in a charger for a car adaptable for recharging personal electronic products such as a mobile phone or PDA with different connecting interfaces.

2. Description of Related Art

Because a mobile phone can be carried about with the user without location limitations, it has already become one of personal belongings for the user. Due to the convenience of the mobile phone, the mobile phone usually is set in a state of alert and it results in the power supply for the mobile phone being a vital subject has to be care. Thus, in order to satisfy the need of the power, the suppliers have developed various chargers for a car so as to recharge the mobile phone during the car being driven.

Besides, a hand holding the steering wheel and another hand holding the mobile for receiving/making a call during the user driving the car is easy to happen a car accident so that some of countries have regulated to prohibit the driver using the mobile phone during the car being moving. Various handset free devices are developed incessantly for meet the preceding regulation and the handset free device, which is associated with loud speaking and sound receiving, has lowered the rate of car accidence significantly and has become one of required equipment used by drivers. Further, a personal electronic product such as the PDA has become required equipment carried about with a businessman due to the coming of electronic era. As for the mobile phone, the replacement rate of mobile phone is always high because of various new functions being added in the mobile phone and the mobile phone being carelessly lost often. It is known that mobile phones in different brands or different styles have a varied connecting interface so that the original charger has to be discarded if a new mobile phone is replaced due to being not identical connecting interfaces. Beside, in order to meet different styles of mobile phones or PDAs, the manufacture has to develop a variety of connectors adaptable for the chargers or the handset free devices. In this way, it increases not only a pressure of storing larger inventory but also the complication of assembling the chargers.

SUMMARY OF THE INVENTION

The crux of the present invention is to provide a charger with a replaceable signal for a car, which includes a casing and a circuit board. The casing is provided with a current taking plug at a lateral side thereof. The circuit board is disposed in the casing and electrically connected to the current taking plug for rectifying and transforming an input power. It is characterized in that the casing at a proper position thereof is provided with a signal socket to electrically connect with the circuit board and a stopper being located therein; a signal line at an end thereof has a signal plug being detachably inserted into the signal socket and the stopper has an engaging piece for engaging with the signal plug and allowing the signal line fixedly joined to the casing laterally and the signal line at another end thereof has a connector. Once the connector of the signal line is connected to an output/input port of a personal electric product and the current taking plug is inserted to a lighter device in a car, a recharging circuit can be performed effectively.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
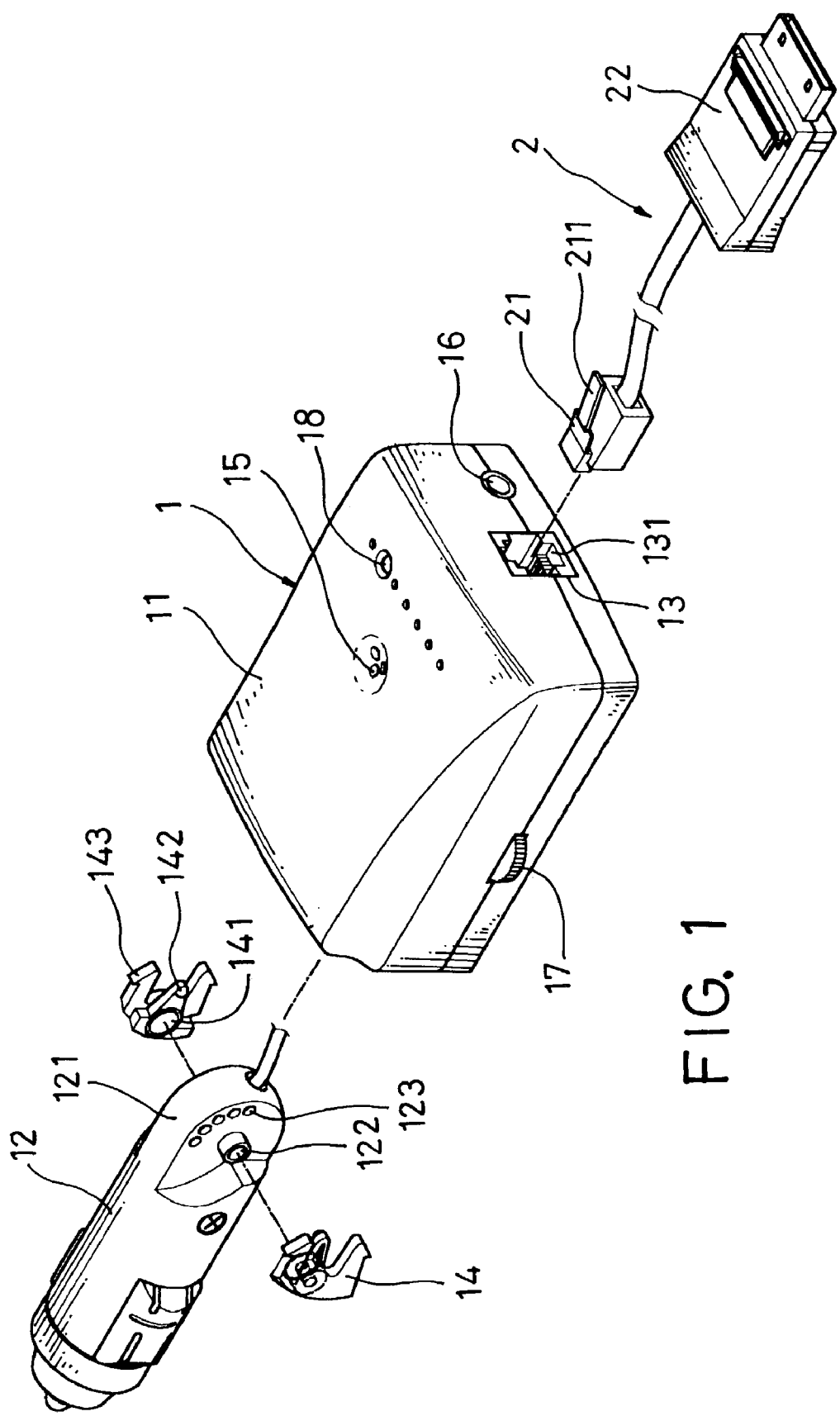
FIG. 1 is an exploded perspective view of a charger with a signal line for a car according to the present invention.
Figure 2:
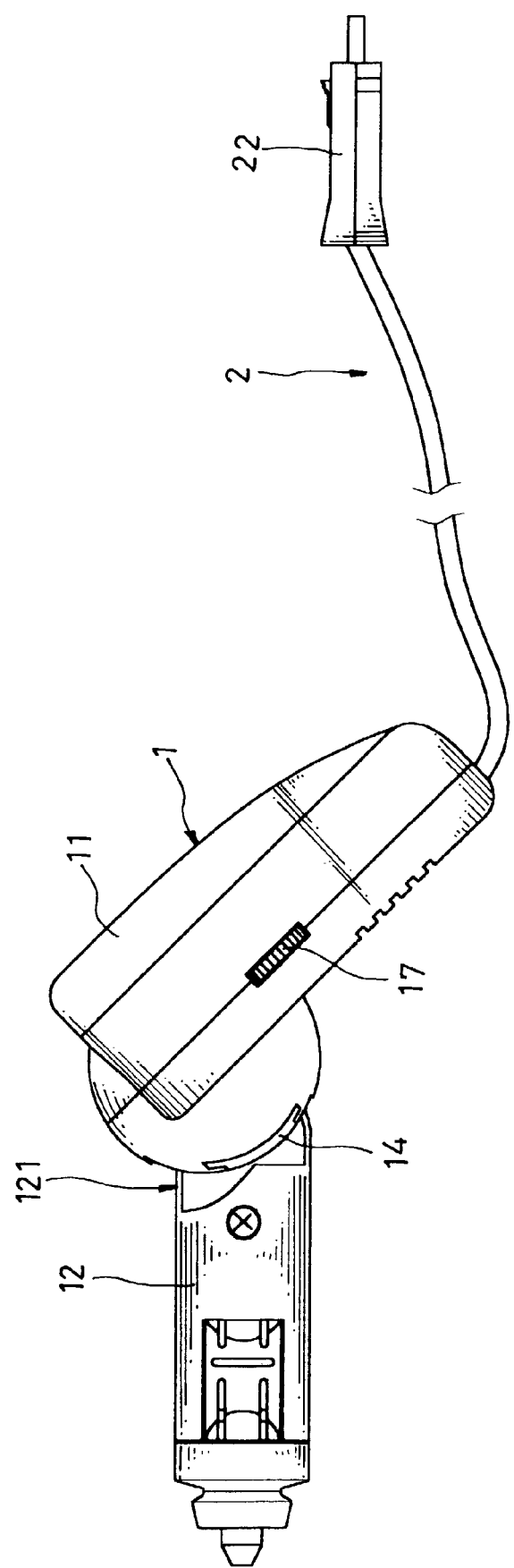
FIG. 2 is a side view of a charger with a signal line for a car according to the present invention.
Figure 3:
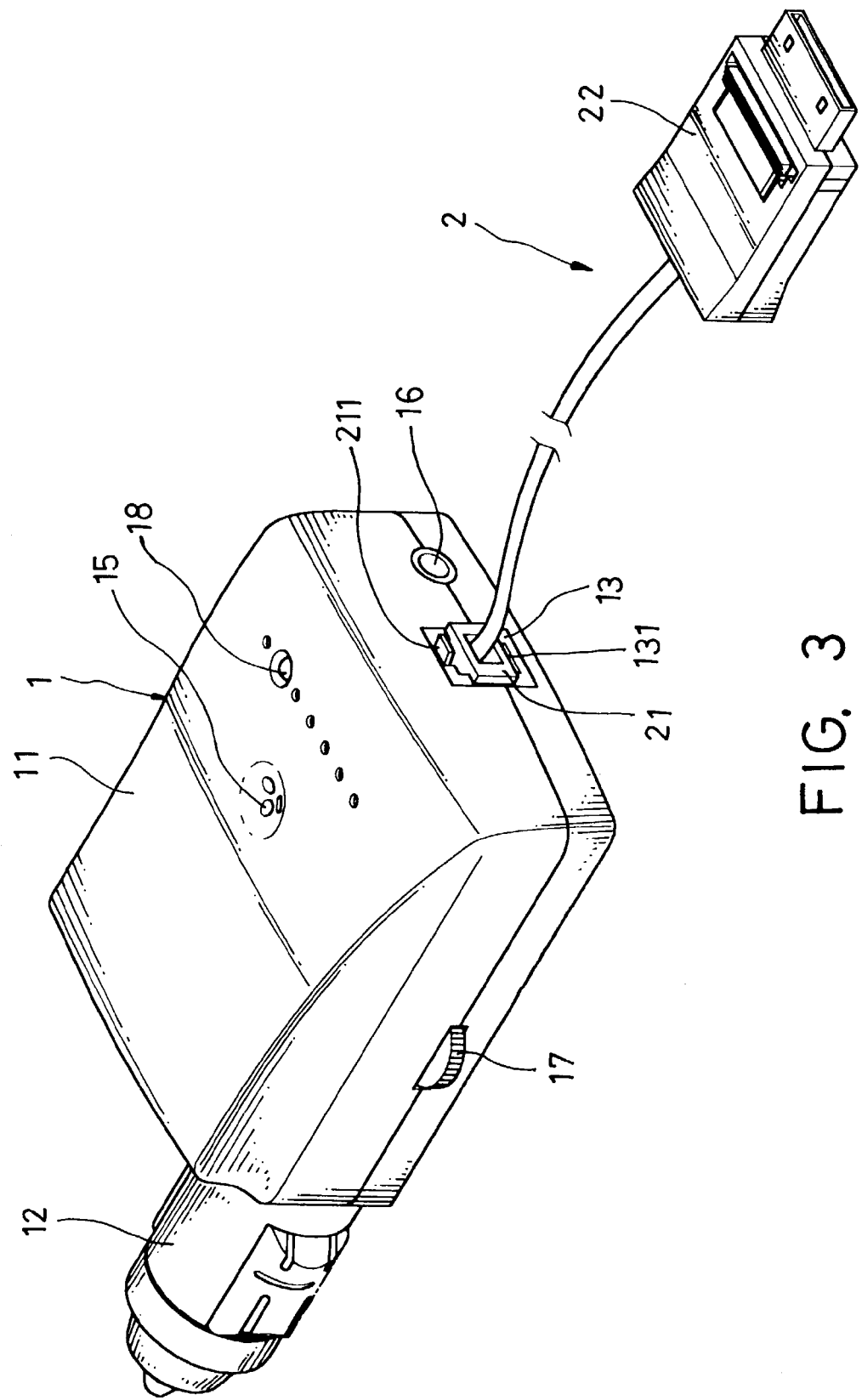
FIG. 3 is an assembled perspective view of the charger with a signal line for a car shown in FIG. 1.

Referring to FIGS. 1 to 3, basically, a charger with a signal line for a car according to the present invention is composed of a charger 1 and a signal line 2.

Wherein, the charger 1 has a casing 11 and a current taking plug 12 extending laterally from the casing 11. The current taking plug 12 can be inserted into a lighter outlet in a car and the current can be rectified and transformed by the circuit board in the casing 11. The difference of the present invention from the prior art resides in that the casing 11 at a proper position thereof has a signal socket 13 with at least a stopper 131 therein, for instance, at least a two core phone receptacle so as to connect with the circuit board for being detachably inserted with the signal line 2.

Besides, the current taking plug 12 at the rear side thereof has an engaging jut 121 and the engaging jut 121 at two opposite lateral sides thereof has a central shaft 122 and a plurality of locating side holes 123 circumferentially disposed next to the central shaft 122 respectively in order to be possible for the casing 11 being rotated and adjusted an angular position. A pair of lock plates 14 are provided at both lateral sides of the engaging jut 121 and each of the lock plates 14 has an axial hole 141 and an engaging projection 142 corresponding to the central shaft 122 and the side holes 123 respectively so that the two lock plates 14 can engage with and sandwich the engaging jut 121. Each of the lock plates 14 at the upper and the lower ends thereof extends laterally an end hook 143 respectively to be fixedly attached to casing holes (not shown) at the front side of the casing 11 so that the current taking plug 12 can be joined to a position between the two lock plates 14. Hence, the user can move and adjust the casing 11 such that the lock plates 14 can be rotated about the central shaft 122 and the two engaging projections 142 can engage with the side holes 123 sequentially to adjust to an optimal angular position such as adjusting a microphone 15 to a best receiving angle of sound.

Further, in order to be possible for the user being free from holding a handset, the casing 11 at the facial side thereof can be provide the microphone 15, a loudspeaker outlet 16, a volume tuner 17 and an indicator light 18 so that functions such as sound receiving, loud speaking, adjusting loud spoken sound and indicating normal power input can be performed additionally. Thus, the present invention can be acted as a handset free device in addition to the original function of recharging.

The signal line 2 at an end thereof is a signal plug 21 such as the phone jack and the signal plug 21 has a lock piece 211 to constitute a state of locking with the stopper 131 in case of being inserted into a signal socket 13 so that the signal line 2 is possible to connect with an end of the casing 11 detachably. The signal line at the other end thereof has a connector 22 for being connected to a personal electronic product such as a mobile phone or the output/input port of a PDA to complete line connection.

Accordingly, if the user lost the personal electronic product and a new one is replaced or the user replaces a different personal product during the car is driven, it is merely needed to connect the connector 22 adaptable for the interface of the output/input port in the new personal electronic product and the signal plug 21 of the signal line 2 in inserted into the signal socket 13 so as to complete the connection of recharging line. Hence, the charger 1 can recharge the personal electronic product through the signal line 2.

Once the charger of the present invention is in use under a condition of the same voltage and current, the only thing has to done by the user is to change the signal line for connecting with the output/input port of a new electronic product in case of the electronic product being replaced or renewed. In this way, it is not necessary for the user to repeat tedious operations of insertion and detachment for the connection in order to replace a new charger. Further, the original charger still can be kept in use without occurring a problem of being discarded or become useless so as not to waste the resource and extra expenditure. Moreover, the manufacture is only necessary to make chargers in different voltages and currents and signal lines in different output/input interfaces such that the inventory can be lowered down effectively to reduce the material cost and sophisticate labors for assembling the product.

While the invention has been described With reference to the a preferred embodiment thereof, it is to be understood that modifications or variations may be easily made without departing from the spirit of this invention, which is defined by the appended claims.

What is claimed is:

1. A charger with a replaceable signal line for a car comprising:
   a casing having a plurality of casing holes;
   a current taking plug, wherein said current taking plug is coupled to and extends in a fixed lateral direction from said casing, wherein said current plug includes a central shaft which traverses said current taking plug in a direction which is perpendicular to said fixed lateral direction and wherein said current taking plug has a first plurality of holes upon a first surface which are at least partially disposed about said central shaft and a second plurality of holes upon a second surface which are at least partially disposed about said central shaft, said first and second plurality of holes being respectively disposed in respective planes which are parallel to said lateral direction, wherein said casing at a proper position thereof is provided with a signal socket and an engaging piece for engaging with a signal plug and allowing the signal line to be fixedly joined to the casing laterally and the signal line at another end thereof has a connector;
   a circuit board being disposed in said casing and electrically connected to said current taking plug for rectifying and transforming an input power signal;
   and first and second substantially identical lock plates, wherein each of said first and second substantially identical lock plates are respectively and movably disposed on a unique one of said first and second surfaces and each of said first and second lock plates respectively includes a first portion which selectively and movably receives said central shaft, a second portion which is disposed on a unique one of said first and second surfaces and which is adapted to be selectively received into one of the holes respectively located on the respective surface upon which said engaging portion is respectively disposed, and an end hook which is selectively received into said plurality of casing holes, said movement of said lock plates upon said central shaft being effective to allow said casing to be moved while concomitantly causing said current taking plug to remain fixed and said end hooks and second portions being effective to place said casing in a selectively fixed position relative to said current taking plug.

* * * * *